June 28, 1955　　　　　　E. W. MILLER　　　　　2,711,673
METHOD AND MEANS FOR PRODUCING SPIRAL FACE
GEARS BY CONTINUOUS ACTION
Filed Aug. 21, 1948　　　　　　　　　　　　　5 Sheets-Sheet 1
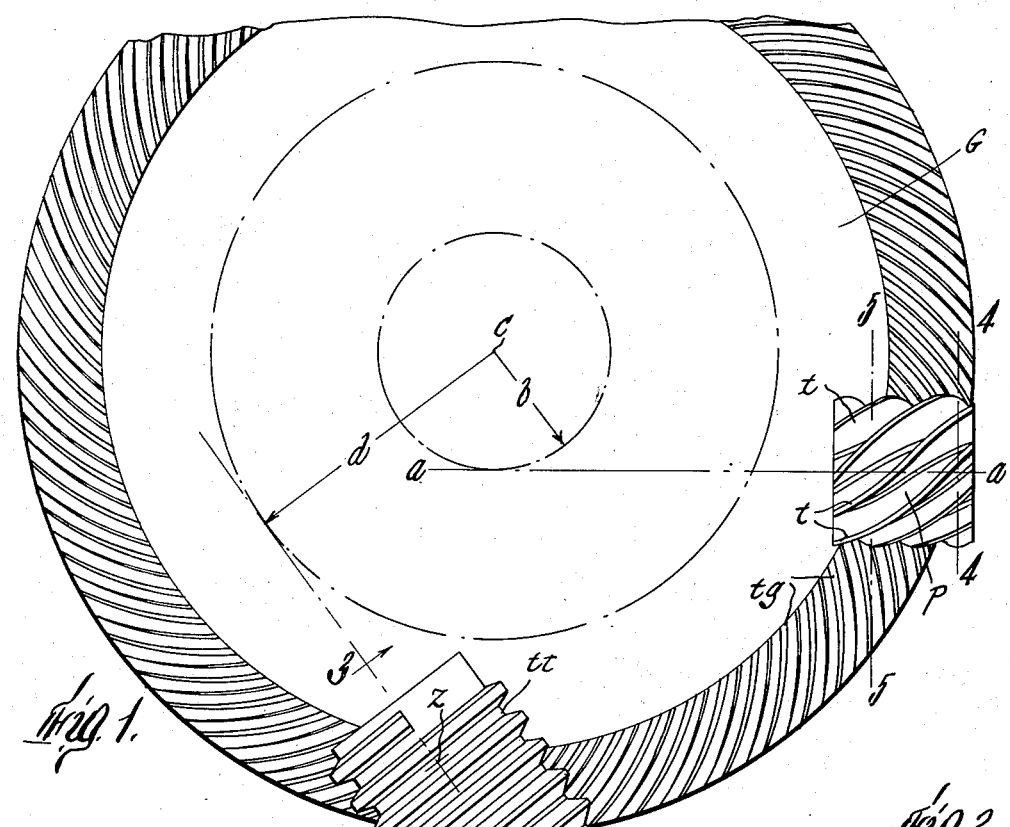
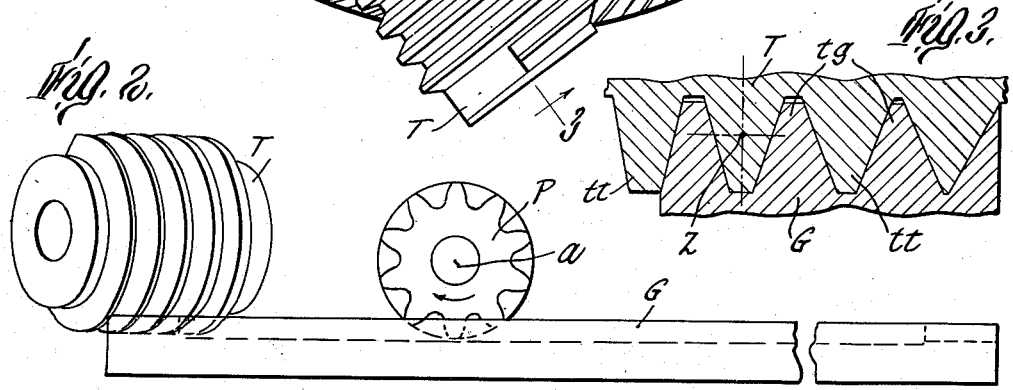
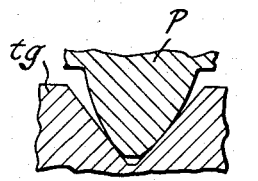
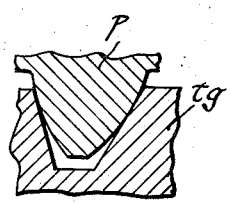

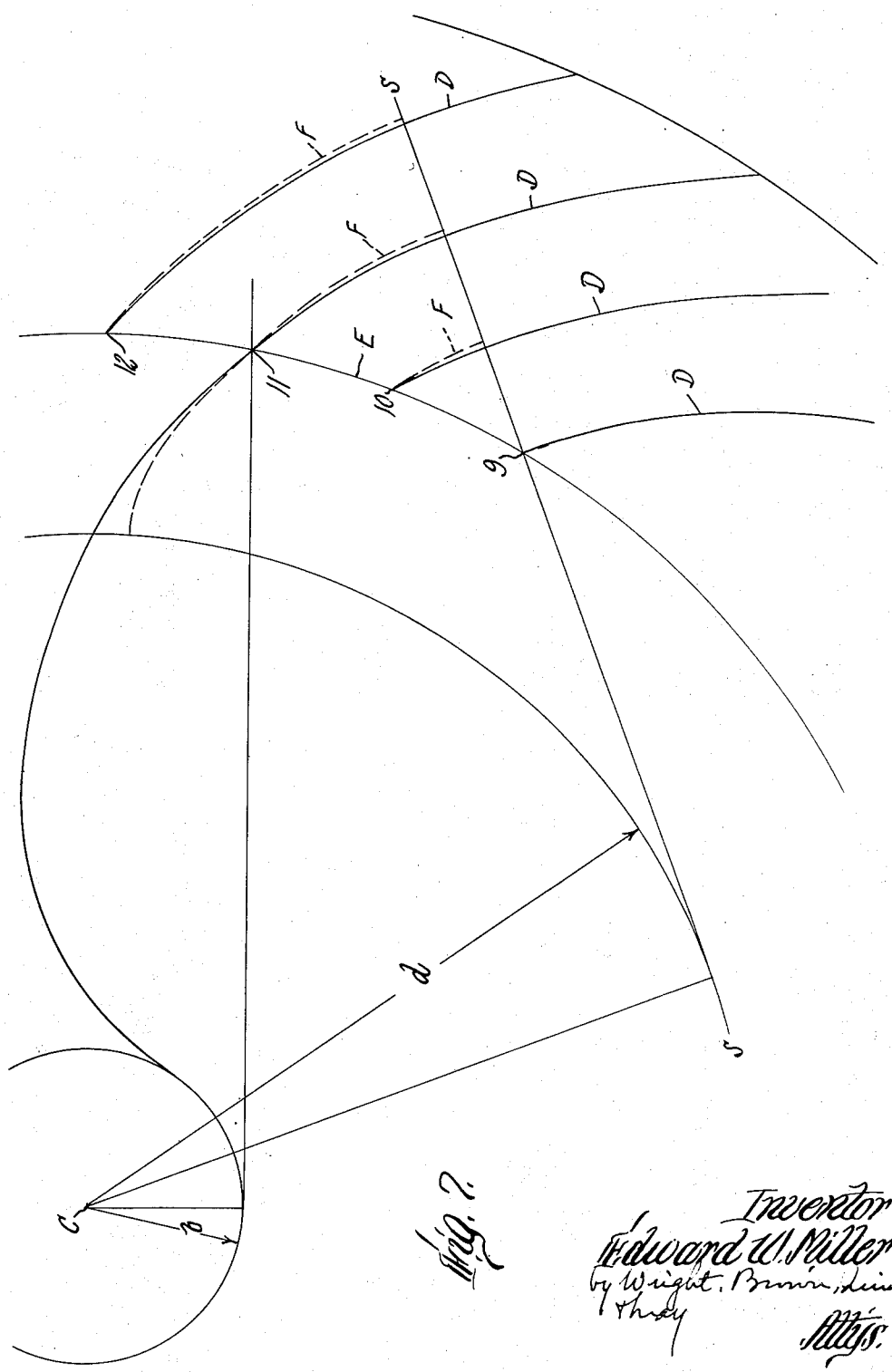

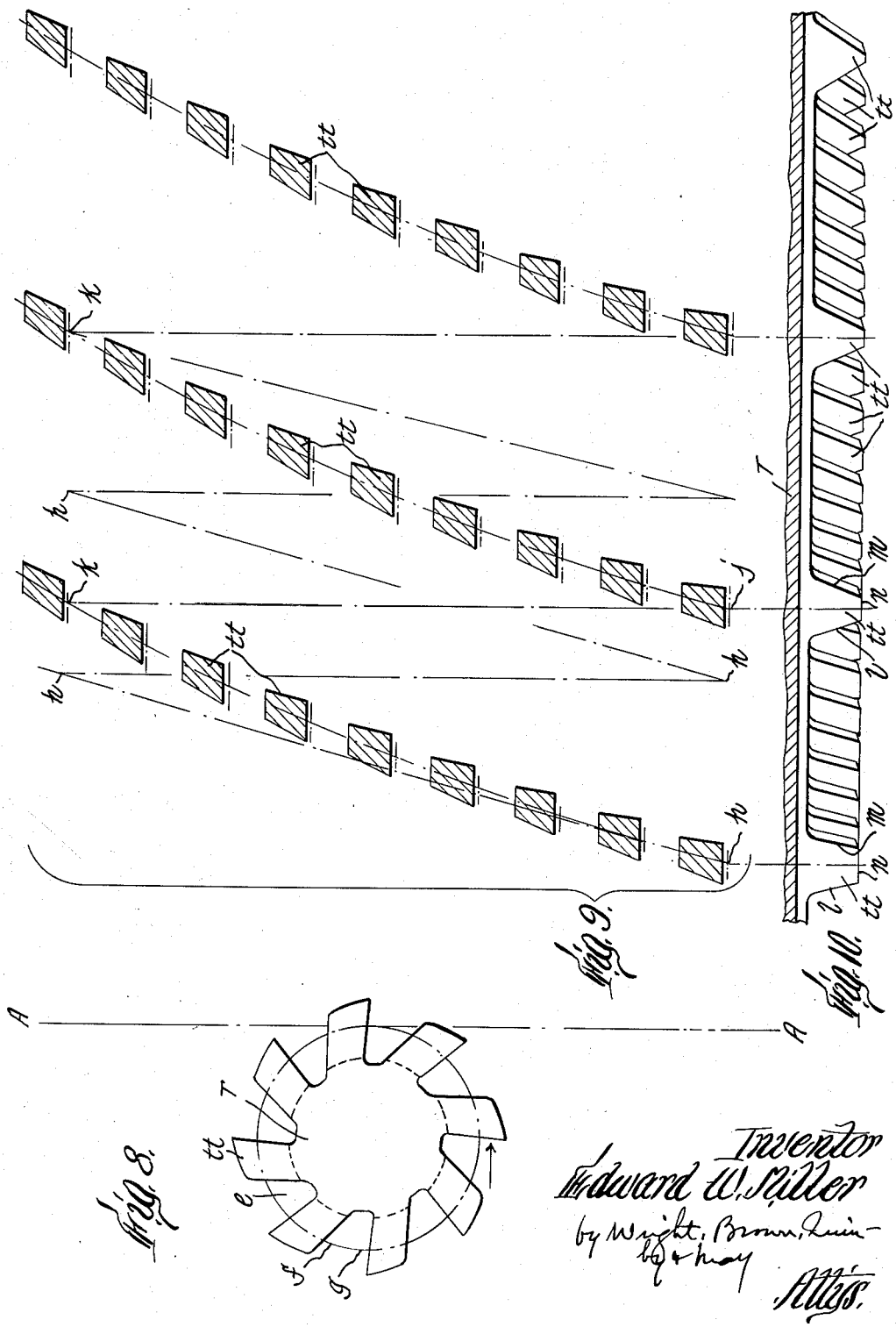

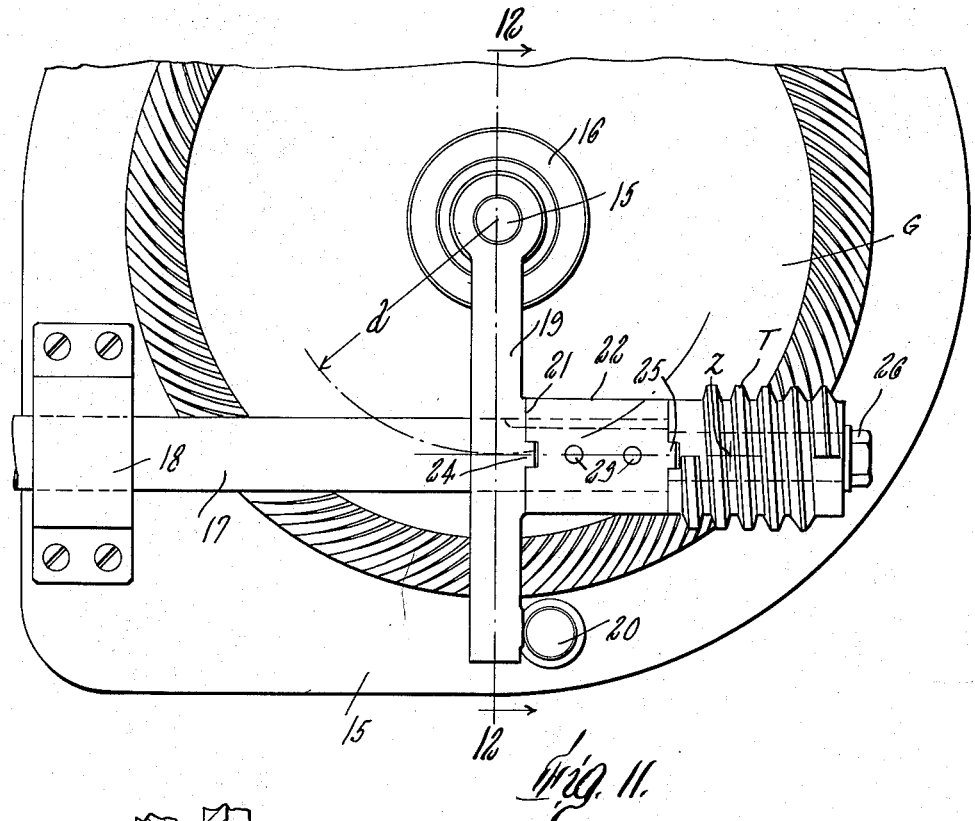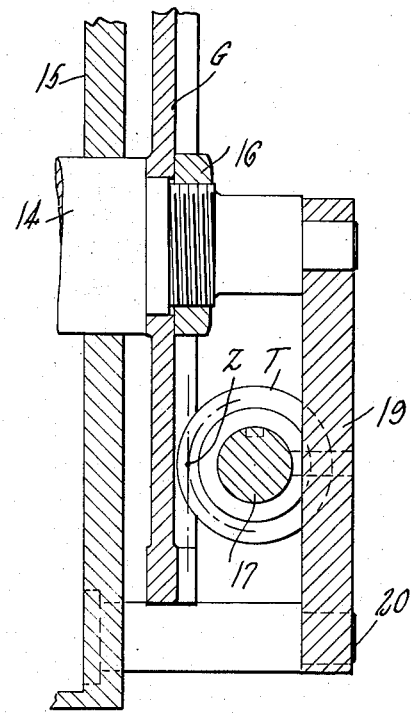

United States Patent Office 2,711,673
Patented June 28, 1955

2,711,673

METHOD AND MEANS FOR PRODUCING SPIRAL FACE GEARS BY CONTINUOUS ACTION

Edward W. Miller, Springfield, Vt., assignor to The Fellows Gear Shaper Company, Springfield, Vt., a corporation of Vermont Application August 21, 1948, Serial No. 45,488

19 Claims. (Cl. 90—4)

The present invention is concerned with the production of face gears. One object is to enable such gears to be cut from blank work pieces by the continuous rotation of a rotary cutting tool, accompanied by simultaneous relative rotation of the work piece and tool about the axis of the work piece and in the course of a single rotation about such axis, whereby greater rapidity of production of finished face gears is accomplished than has been possible by previously known means. A further object is to provide a method of setting and using such a tool so as to cut teeth in a face gear with accurate form and dimensions. Related to the foregoing objects are those of finishing a previously cut gear of the character indicated by means of a tool similar to that by which initial cutting is performed but which effects its action by abrasion or rubbing action.

A face gear is similar to a bevel gear in that it meshes with its companion pinion on pitch cones but differs in that it is adapted to mesh with a pinion which is not beveled but is of cylindrical character and is therefore capable of being displaced along its axis without adversely affecting the mesh or action between the gear and pinion. This capability constitutes an important advantage of a face gear and pinion couple over a bevel gear and pinion couple since it avoids the necessity of accurately locating the pinion along its axis with respect to the gear in operating mesh.

Pinions to mesh with face gears may be either spur or helical. When the pinion of a face gear and pinion couple is helical, the teeth of the face gear have a spiral curvature from end to end (i. e., from inner to outer circumference of the zone in which they are formed). This character of gearing is particularly desirable for many uses, such as that in the rear axle drive of motor vehicles. In such couples the helical pinion may be either on center with respect to the axis of the gear (that is, located so that its axis intersects the gear axis), or offset so that its axis passes the gear axis at a distance therefrom. This invention is primarily concerned with tools for cutting, and otherwise operating on, teeth in face gears which are designed to mesh with helical pinions, either in the on center or an off center relation; and the embodiment of the invention chosen for illustration here is one for producing face gear teeth capable of meshing accurately with a helical pinion of which the axis is offset from the gear axis.

In the drawings which accompany this specification—

Fig. 1 is a face view of a face gear and offset conjugate helical pinion, and shows also the character and operative location of a tool in the nature of a hob adapted to cut face gear teeth conjugate to those of the pinion;

Fig. 2 is a side elevation of the same as seen from the right hand side of Fig. 1;

Fig. 3 is a section on a plane through the axis of the cutter perpendicular to the plane of the gear, the location of which is indicated by the line 3—3 of Fig. 1;

Fig. 4 is a section on the line 4—4 of Fig. 1 located where the axial plane of the pinion perpendicular to the face gear intersects the outer circumference of the gear;

Fig. 5 is a section on line 5—5 of Fig. 1 taken on a plane parallel to the plane of Fig. 4, which intersects the inner circumference of the tooth bearing zone of the gear;

Fig. 7 is a diagram illustrating graphic mode of determining the lead of the hob type cutter shown in Figs. 1 and 2.

Fig. 8 is an end view of the cutting tool having teeth disposed in helical arrangement with a variable lead in accordance with the principles of the present invention;

Fig. 9 is a development view of three convolutions of the teeth of the cutter represented in Fig. 8, showing in an exaggerated manner the variation of the convolutions from a helix of uniform lead.

Fig. 10 is an axial development of the cutter teeth;

Fig. 11 is a face view of holding means for a face gear and cutting tool in operative relationship showing also an illustrative means for setting the cutting tool in correct axial and angular position for commencement of cutting operations on a face gear;

Fig. 12 is a sectional view taken on line 12—12 of Fig. 11.

Like reference characters designate the same parts whever they occur in all the figures.

Figure 6:
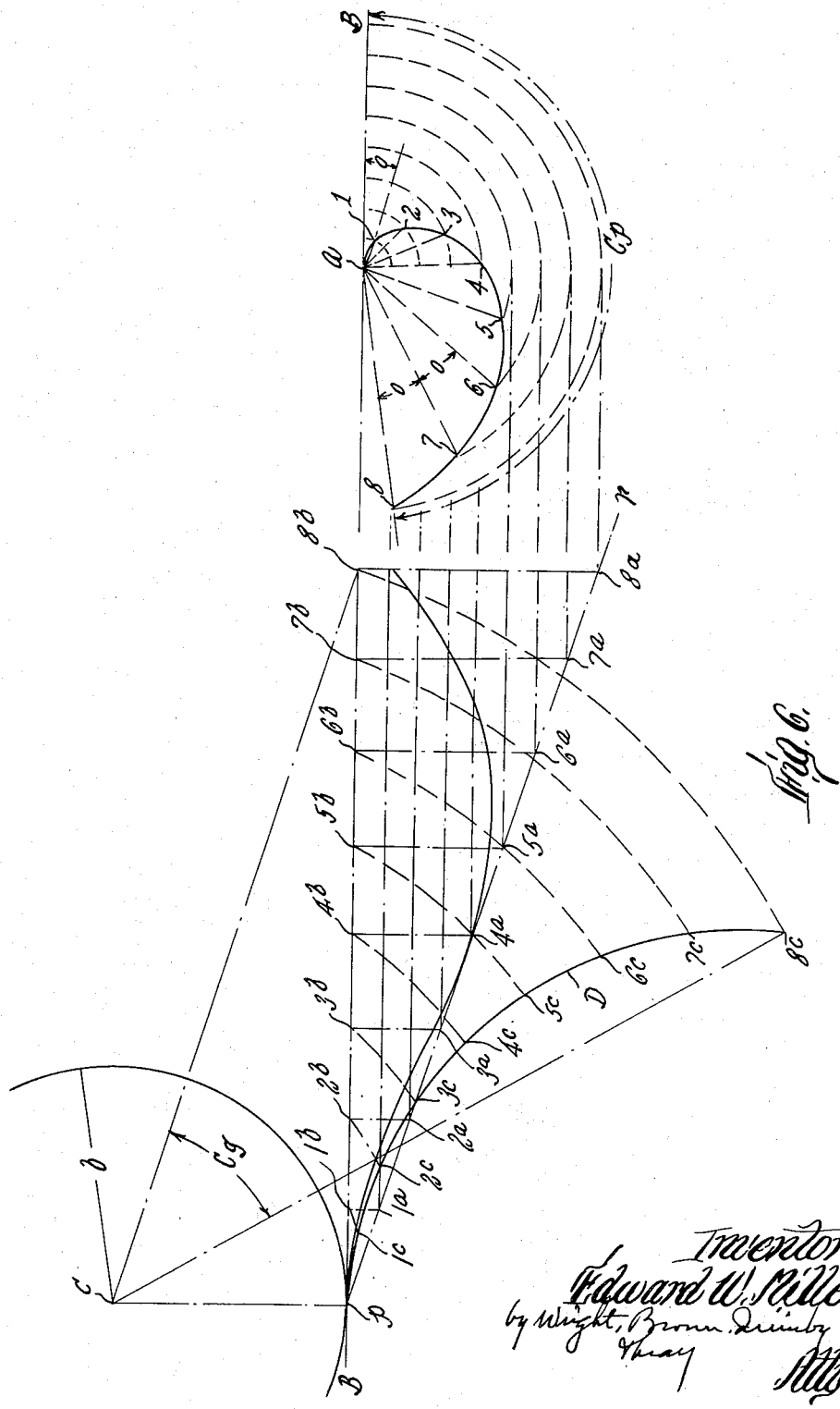
Fig. 6 is a diagram showing a graphic method of determining the spiral longitudinal curvature of a face gear tooth.

Referring to Figs. 1–5 inclusive, G and P represent respectively the gear and pinion of a face gear and pinion couple of which the pinion P is of cylindrical character with helical teeth $t$ and its axis $a$—$a$ is offset a distance $b$ from the axis $c$ of the gear. The teeth $tg$ of the gear are located in a circular zone at its circumference and are of spiral curvature in their length dimension. The spacing between them is progressively variant, and the slopes of their side faces progressively less steep, from the inner circumference to the outer circumference of the zone in which the teeth are located.

Face gears of this character and one method of cutting them are known and are disclosed in my prior Patent No. 2,308,891, dated January 19, 1943, and entitled Method and Apparatus for Gear Generation. It is my present object to effect the cutting of such a gear by means other than those disclosed in said patent and to obtain a very efficient cutting action. In the attainment of this object I have devised novel rotary cutting tools and a novel mode of locating and operating them, whereby the operation is performed by the continuous rotation of the tool about its axis, without any axial displacement, and is completed during a single depth feed and a single relative rotation of the work piece and tool around the axis of the work piece, or one rotation plus such fraction of a rotation as may occur during the progress of the depth feed, in case depth feeding and relative rotation around the gear axis are effected simultaneously.

The tools referred to in this specification include those having definitely formed teeth with cutting edges for forming teeth in an uncut gear blank, and also similar tools without cutting teeth which obtain their cutting action by means of abrasives, or effect a rubbing, burnishing action. I have devised tools of this character in which the operative elements are arranged helically around the axis. Those which are adapted to form teeth in an uncut blank are made with discontinuous teeth in helical arrangement around the axis of the tool, with cutting edges and side clearances similar to the teeth of the well known hob type of cutter. But they differ from standard hobs in that the lead of the tooth helix is not uniform but varies from convolution to convolution and the teeth are different from one another and individual teeth may have different inclinations at opposite sides. Tools of the abrading and rubbing type embodying this invention have helical ribs without discontinuous teeth but are similar to the toothed cutters in that the lead of the rib is variable and the side faces of the rib may be of different inclinations in different convolutions and in different parts of the same convolution.

In Figs. 1 and 2, a tool T is shown having a surrounding helical operating portion. In these figures the helical part is shown as a continuous rib without interruptions or teeth. This mode of illustration is adopted partly for simplicity and partly to make plain that tools of the abrading and rubbing type are included within the scope of the invention. But it is to be understood that the tool thus shown typifies tools with discontinuous teeth in helical alinement fashioned similarly to the teeth of a standard hob. This tool may be considered as representing that shown in Fig. 8, wherein the convolutions of the helix are intersected by transverse gashes which form separate teeth with cutting edges at one boundary of the respective gashes and with cutting clearance at their sides and circumferential faces. The helix of teeth or rib has a relatively low helix angle.

In order to enable such a tool to perform its cutting action properly, it must be located with its axis (which coincides with the line 3—3), offset from the axis $c$ of the gear a distance $d$ which is greater than the distance $b$ of offsetting of the pinion P. The distance $d$ varies for different gears, and may vary within a narrow range for any one gear. The limits of such range are determined by practical considerations, including the necessity of avoiding interferences. The optimum displacement is that in which the axis of the tool is tangent to a circle whose circumference is equal to the number of teeth in the gear to be cut, multiplied by the normal pitch.

The variable lead of the tool helix is determined by the offset distance of the tool and the pitch of the gear teeth on their intersections with that axial plane of the cutter which is perpendicular to the plane of the gear. Fig. 3 shows four teeth of the gear intersected by the plane 3—3 and the convolutions of the tooth helix of the tool which engage the gear teeth. This figure illustrates roughly the variations in lead of the tooth helix and in pressure angles of successive teeth of the tool. These characteristics are further shown in an exaggerated way by Figs. 8, 9 and 10, where Fig. 8 is the end view of a tool like that shown in Figs. 1 and 2 with longitudinal gashes $e$ which subdivide each convolution of the helix into separate teeth $tt$. Fig. 9 shows a development on the plane A—A of three convolutions of the helically arranged teeth. This development is made by representing the teeth as being intersected by a cylindrical surface $f$ tangent to the plane A—A and by separating the cylindrical surface at points opposite to the tangent point and rolling it flat on the plane A—A together with the sections of the teeth. The straight lines $h$—$h$, $h$—$h$ represent the development on the same plane of a helix of uniform lead, while the diverging lines $h$—$k$ and $j$—$k$ represent the deviation of the actual tooth helix from the helix of uniform lead; this representation, however, being on a greatly exaggerated scale for clarity. The uppermost tooth in the first, and that in the second developed convolution of Fig. 9 are repeated at the bottom of the second and third developed convolutions, respectively.

Fig. 10 is a developed projection of all the teeth of the three convolutions referred to on an axial plane of the cutter, the teeth being located by projection perpendicularly from the teeth shown in Fig. 9. The cutting edges of one tooth in each of three convolutions are shown and identified by the reference letters $l$, $m$ and $n$. These teeth are represented as being viewed in the direction of the arrow at the under side of Fig. 8. Other teeth of the several convolutions appear as partially obstructed by those in front. The difference in pressure angle of each tooth from every other tooth is plainly shown by Fig. 10.

The spiral curvature of the teeth of a face gear to mesh with any helical pinion in any practicable offset relationship, or in on center relationship, and the pressure angles of different parts of such teeth can be determined in a number of ways. One is the generation of an actual gear according to the method disclosed in my prior Patent No. 2,308,891 previously referred to, with the use of a gear shaper cutter having the same number of teeth, of the same pitch, pressure angle, and helix angle, as the pinion. Other methods are graphic and mathematical.

A graphic method of determining the longitudinal spiral curvature of face gear teeth to mesh with a given helical pinion operating with a given distance of offset is shown in Fig. 6. Here $a$ and $c$ represent the axes of the pinion and gear respectively, and $b$ represents the distance of offset between these axes. A reference plane B—B is laid off through the axis point $a$ tangent to a circle of which the radius is equal to the offset $b$. Radial lines are drawn from the center $a$ making equal angles $o$ with the reference plane B—B and with each other; and points 1, 2, 3, 4, 5, 6, 7 and 8 are laid off on the successive radial lines at progressively equal increments of distance from the axis $a$. These points represent successive positions of a point traveling at uniform speed along the pitch cone of the pinion after successive equal angles of rotation of the pinion. It is assumed that the total rotation of the pinion amounts to an angle Cp. At the same time the gear, having a larger number of teeth than the pinion, rotates through a smaller angle designated Cg. A line $p$—$r$ is drawn from the tangent point of the reference plane with the offset distance arc, making an angle with the reference plane equal to the pitch cone angle of the gear. Points $1a$, $2a$, $3a$, etc. to $8a$ are located on the line $p$—$r$ by projection of tangent lines (parallel to the plane B—B) from arcs around the axis $a$ passing through the points 1, 2, 3, etc. to 8. By projecting the points $1a$ to $8a$ on the reference plane B—B, points $1b$, $2b$, etc. to $8b$ are located. Then arcs drawn around the gear center $c$ through the points $1b$, etc. to $8b$ and corresponding in length to the angles through which the gear rotates while the pinion is rotated through successive angles $o$, establish points $1c$, $2c$, etc. to $8c$. The curve D drawn through the last points is the spiral curvature of the gear teeth.

A graphic method of determining the variants of the tool helix from a helix of uniform lead is illustrated in Fig. 7. Here a line $s$—$s$ representing the axis of the tool is drawn at a distance $d$ from the axis $c$ of the gear corresponding to the offset previously described. Spiral curves D, being the correct spirals of the face gear teeth are drawn from points 9, 10, 11, 12, equally distant from one another on an arc E which represent the inner circumference of the tooth bearing zone of the gear; the point 9 being the intersection of the line $s$—$s$ with the arc E. Other curves F, being the spiral curves which would be generated by a cutter having a uniform lead, are drawn through the points 10, 11 and 12. Curves F do not coincide with curves D, a fact which shows graphically that a cutter with teeth in a helix of uniform lead, located in offset position, would not cut teeth of correct curvature. The difference between the pairs of curves D and F on the line $s$—$s$ is a measure, according to the scale of the diagram, of the extent to which the helix of the tool must be varied from a helix of uniform lead.

The pressure angles of the tool teeth or rib are determined graphically or mathematically according to general principles of gearing with factors of numbers of teeth, helix angle of the pinion teeth, and location of the points of equal linear speed on the pinion and gear. The pressure angles of opposite sides of the teeth may be the same or different. For some purposes it is desirable to have different pressure angles on the opposite sides of the teeth. Figs. 4 and 5 show teeth of pinion and gear which have such different pressure angles at opposite sides.

A cutting tool thus particularly designed for the purpose set forth must be accurately located prior to the commencement of action on an uncut blank. That is, not only must its axis be at the correct offset distance $d$ from the center of the gear blank, but the tool itself must be in a prescribed axial and angular position, so that, when entered to full depth in the work piece, the varying lead of its convolutions will match with the varying pitch of the teeth along their intersection with the axial plane of the tool. For convenience of illustration, a point $z$ has been arbitrarily selected as occupying a definite position in the gear and also a definite position in the tool. The tool must be placed so that the locations of this point on the tool and work gear coincide.

One of a number of means for properly locating the tool for this purpose is shown in Figs. 11 and 12 in connection with parts of a machine for cutting face gears with a tool of the character described. A work spindle 14 passes through a plate 15 which may be a part of the framing of a machine and the gear G to be cut is secured thereon by a lock nut 16. A tool spindle 17 is supported in part by a bearing 18 and carries the tool T, and is located at a prescribed offset distance $d$ from the axis of the work spindle. An arm 19 is placed removably on the work spindle 15 and brought to bear against a stop 20 so located that a bearing surface 21 on the arm 19 is then perpendicular to the axis of the tool spindle.

A collar 22 is placed on the spindle 17 between arm 19 and the tool T and provided with set screws 23 by which it may be secured to the spindle. A key 24 on the arm 19 is adapted to enter a notch in the adjacent end of collar 22, and a key 25 on the opposite end of the colar is adapted to enter a notch in the adjacent end of the tool. These keys and notches are angularly related, and the collar 22 is of such length that the selected point $z$ of the tool will be at the prescribed distance from the center of the gear and otherwise correctly located after completion of depth feeding, provided the arm 19 was first brought into contact with stop 20, the collar was brought into engagement with the surface 21 of the arm and in position for receiving the key 24, and the tool was brought against the outer end of collar 22 and in angular relation to receive the key 25.

After the tool has been positioned as described, the set screws 23 are tightened on the shaft, the tool is held firmly against collar 22 by a nut 26, and arm 19 is displaced or removed to leave the tool spindle free to rotate.

For convenient generic designation of the tools comprehended within this invention and the operating parts thereof, I have adopted the term "operating helix" to include comprehensively a helical series of discontinuous teeth, such as are shown in Figs. 8–10, and also continuous ribs for abrading or burnishing purposes. The essential characteristics of such tools and of the methods according to which they are used for making face gears are essentially alike in principle whether the gears to be made are designed for running with pinions which are off center or those which are on center. Therefore I consider, and so designate, an on center face gear and pinion couple as being the limiting case of an offset couple, in which the offset distance is zero.

What I claim is:

1. A rotatable face gear making tool having an external operating helix, said helix having a variable lead and sloping sides disposed at different inclinations at different points along the line of the helix.

2. A rotatable face gear making tool having an external operating helix with sloping sides, the opposite sides of the helix being disposed at relatively different angles with respect to the axis of the tool and said sloping sides having varying inclinations at different points along the line of the helix.

3. A rotatable face gear making tool having an external operating helix, said helix having sloping sides of which the inclinations at different points along the helix are different from one another.

4. A rotary cutting tool having a series of teeth on its exterior disposed in a helix including a plurality of convolutions, said helix being of varying lead and said teeth having cutting edges in planes transverse to the length of the helix, and the lateral edges of different teeth being disposed at respectively different inclinations to the axial direction of the tool.

5. A rotary cutting tool having a series of teeth on its exterior disposed in a helix including a plurality of convolutions, said helix being of varying lead and said teeth having cutting edges in planes transverse to the length of the helix, and the lateral edges of different teeth being disposed at respectively different inclinations to the axial direction of the tool, and the opposite side edges of individual teeth being differently inclined.

6. The method of cutting a face gear to mesh with a given helical pinion which comprises positioning a cutting tool having generally helically disposed teeth thereon in which the helical center line of the teeth is displaced varying amounts from a helix of uniform lead in cutting relation to the face gear and so locating the cutting tool that the axis of said cutting tool is tangent to a circle drawn about the center of rotation of the gear, imparting a cutting rotation about its axis to said tool, and effecting a relative rotation between the gear and the tool around the axis of the gear.

7. The method of cutting a spiral face gear to mesh with a given helical pinion having its axis of rotation offset a prescribed distance from the axis of said gear, which comprises providing a cutting tool having external teeth disposed in a helix of varying lead around the axis of the tool, locating such tool and a face gear blank with the axis of the tool offset from the axis of the gear a distance greater than the offsetting of the pinion with which the gear is to mesh, imparting a cutting rotation about its axis to said tool, and effecting a relative rotation between the gear and the tool around the axis of the gear.

8. The method of cutting a face gear to mesh with a given helical pinion having its axis of rotation offset a prescribed distance from the axis of said gear, which comprises providing a rotatable cutting tool having a series of external teeth disposed in a helix of varying lead and of which the helix angle in all parts is lower than the helix angle of the pinion with which such gear is to mesh, locating such tool and a face gear blank with the axis of the tool offset from the axis of the gear blank a distance greater than the prescribed offset distance between the pinion and gear axes, imparting a cutting rotation about its axis to said tool, and effecting a relative rotation between the gear and the tool around the axis of the gear.

9. The method of cutting a face gear as defined in claim 6 wherein said circle has a circumference equal to the number of teeth in the gear to be cut multiplied by the normal pitch of the teeth of said gear.

10. In a gear finishing machine a work spindle, a tool spindle disposed transversely to the work spindle at one side thereof, locating means cooperating with said work spindle to space said tool spindle at a predetermined distance from said work spindle, a helical tool having an operating helix of varying lead thereon mounted on said tool spindle, means cooperating with said tool spindle to locate said tool in a predetermined axial position on said tool spindle, and means on said tool spindle operable to set said tool in a prescribed angular position so that a prescribed reference point in the tool will coincide with a prescribed reference point in a gear blank mounted on said work spindle when the tool has cut to the prescribed depth in the blank.

(References on following page)

References Cited in the file of this patent

UNITED STATES PATENTS

| | | |
|---|---|---|
| 1,372,340 | Derr | Mar. 22, 1921 |
| 1,596,912 | Wildhaber | Aug. 24, 1926 |
| 1,772,634 | Olson | Aug. 12, 1930 |
| 1,795,093 | Olson | Mar. 3, 1931 |
| 1,833,227 | Olson | Nov. 24, 1931 |
| 1,849,810 | Simmons | Mar. 15, 1932 |
| 2,101,183 | Lawton | Dec. 7, 1937 |
| 2,102,659 | Wildhaber | Dec. 21, 1937 |
| 2,304,586 | Miller | Dec. 8, 1942 |
| 2,338,366 | Trbojevch | Jan. 4, 1944 |
| 2,389,815 | Ransome | Nov. 27, 1945 |
| 2,414,790 | Barnard et al. | Jan. 28, 1947 |

FOREIGN PATENTS

| | | |
|---|---|---|
| 205,138 | Great Britain | Oct. 10, 1923 |